(12) United States Patent
Ruvio et al.

(10) Patent No.: US 10,944,765 B2
(45) Date of Patent: Mar. 9, 2021

(54) SECURITY SYSTEM FOR MACHINE TO MACHINE CYBER ATTACK DETECTION AND PREVENTION

(71) Applicant: Red Bend Ltd., Hod-Hasharon (IL)

(72) Inventors: Guy Ruvio, ElAd (IL); Yuval Weisglass, Kfar-Saba (IL); Saar Dickman, Zur-Moshe (IL)

(73) Assignee: Red Bend Ltd., Hod Hasharon (IL)

(*) Notice: Subject to any disclaimer, the term of this patent is extended or adjusted under 35 U.S.C. 154(b) by 165 days.

(21) Appl. No.: 15/549,365

(22) PCT Filed: Feb. 8, 2015

(86) PCT No.: PCT/IL2015/050143
§ 371 (c)(1),
(2) Date: Aug. 7, 2017

(87) PCT Pub. No.: WO2016/125133
PCT Pub. Date: Aug. 11, 2016

(65) Prior Publication Data
US 2018/0026999 A1    Jan. 25, 2018

(51) Int. Cl.
*H04L 29/06* (2006.01)
*H04W 12/12* (2021.01)
(Continued)

(52) U.S. Cl.
CPC ...... *H04L 63/1416* (2013.01); *H04L 41/0631* (2013.01); *H04L 63/02* (2013.01);
(Continued)

(58) Field of Classification Search
CPC ... H04L 63/1416; H04L 63/02; H04L 63/145; H04L 41/0631
See application file for complete search history.

(56) References Cited

U.S. PATENT DOCUMENTS 9,117,069 B2 * 8/2015 Oliphant ............. H04L 63/1416
9,294,503 B2 * 3/2016 Thompson .......... H04L 63/1416
(Continued)

OTHER PUBLICATIONS

Supplementary European Search Report and the European Search Opinion dated Aug. 10, 2018 From the European Patent Office Re. Application No. 15881014.3. (9 Pages).

*Primary Examiner* — Vance M Little
(74) *Attorney, Agent, or Firm* — McCoy Russell LLP

(57) ABSTRACT

Apparatus, system and method useful for machine to machine (M2M) communication cyber-attack detection and prevention, are provided. An embedded security bridge (ESB), operatively connected to at least one proximal machine and at least one M2M module. The M2M module is in communication with at least one remote machine, and configured to enable communication between at least one remote machine and at least one proximal machine through the ESB. The ESB includes: one or more inspection units, configured for communication analysis for identifying communication and/or content suspicious as malicious, and, one or more decision units operatively connected to the inspection unit. The decision unit is configured to perform at least one action based on analysis of at least one inspection unit. The ESB is configured to detect by means of the inspection unit and prevent by means of the decision unit cyber-attacks on the proximal machine, the remote machine, or both.

19 Claims, 5 Drawing Sheets

(51) Int. Cl.
  *H04L 12/24* (2006.01)
  *H04W 84/18* (2009.01)
  *H04W 84/12* (2009.01)
  *H04W 4/70* (2018.01)
(52) U.S. Cl.
  CPC ........ *H04L 63/145* (2013.01); *H04L 63/1458* (2013.01); *H04L 63/1466* (2013.01); *H04W 12/12* (2013.01); *H04W 4/70* (2018.02); *H04W 84/12* (2013.01); *H04W 84/18* (2013.01)

(56) References Cited

U.S. PATENT DOCUMENTS

| | | | | |
|---|---|---|---|---|
| 2003/0004689 A1* | 1/2003 | Gupta | .................... | G06F 21/55 702/188 |
| 2004/0225718 A1* | 11/2004 | Heinzel | ................ | G06Q 10/107 709/206 |
| 2010/0057485 A1 | 3/2010 | Luft | | |
| 2010/0125913 A1* | 5/2010 | Davenport | .............. | G06F 21/54 726/25 |
| 2011/0016528 A1* | 1/2011 | Zhou | ................... | H04L 41/0677 726/23 |
| 2011/0131324 A1* | 6/2011 | Chaturvedi | ............. | H04L 63/20 709/225 |
| 2011/0314546 A1* | 12/2011 | Aziz | ...................... | G06F 21/56 726/24 |
| 2013/0127618 A1 | 5/2013 | Sheleheda | | |
| 2014/0013434 A1* | 1/2014 | Ranum | ................. | H04L 63/145 726/24 |
| 2014/0096251 A1* | 4/2014 | Doctor | ................ | H04L 63/1408 726/23 |
| 2014/0229605 A1* | 8/2014 | Besser | .................... | H04L 43/12 709/224 |
| 2014/0280889 A1* | 9/2014 | Nispel | .................... | H04L 43/04 709/224 |

* cited by examiner

SECURITY SYSTEM FOR MACHINE TO MACHINE CYBER ATTACK DETECTION AND PREVENTION

CROSS-REFERENCE TO RELATED APPLICATIONS

This application claims priority to and is the National Stage filing of International Application No. PCT/IL2015/050143, titled SECURITY SYSTEM FOR MACHINE TO MACHINE CYBER ATTACK DETECTION AND PREVENTION filed on Feb. 8, 2015, the content of which is expressly incorporated by reference in its entirety.

FIELD OF THE INVENTION

The present invention relates to security systems and methods in general and in particular to protecting machine to machine systems from cyber-attacks.

BACKGROUND OF THE INVENTION

Machine to machine (M2M) communication is the basis for many automated processes. This interaction or communication between at least two machines, without human intervention enables wireless coordination between at least two machines and reflects on machine decision making. Machine to machine communications mainly uses existing networks, such as wireless networks used by the public (e.g. cellular networks, WLAN), to transmit the data. This technology is employed in many fields such as meter reading by companies supplying electricity or gas, communication between vending machines and their supplier, sensor reading of various steps in a production process of which at least one step is done remotely, city automation (e.g. traffic control systems) employing the communication of information from remote sensors to at least one computer. M2M communication is exposed to cyber-attacks from the outside. Affecting machine to machine communication can cause harm to any system relying on feedback from remote locations for its operation.

Considering the large number of M2M connected devices expected to be deployed, in a highly distributed network, global enforcement of communication security might not be practically feasible. The conventional centralized IT security network model, protected by a firewall, is challenged by the need for a dispersed model. M2M connected devices are expected to operate unattended for long periods of time which requires robust security mechanisms such as authentication, the ability to recognize and isolate misbehaved machines (such as terminals), tamperproof design and others. Many M2M connected machines are limited in their power consumption, therefore energy efficient security mechanisms should be provided. Many types of cyber-attacks are known in the art, these include false representation of data, disabling at least one machine, obtaining the information from a communication, hijacking a communication, and others.

Several examples are known in the art that disclose detection and/or protection of machine to machine communication.

US 20130291100 A1, titled: "DETECTION AND PREVENTION OF MACHINE-TO-MACHINE HIJACKING ATTACKS" discloses a method for detecting and preventing M2M hijacking attacks via a network node based system. The method includes receiving at a network node a packet destined for an intended destination. The network node determines whether the packet is associated with M2M communication, and whether forwarding of the packet to the intended destination is prohibited. Forwarding of the packet is prohibited when the packet is originated from a first machine to-machine device and is destined to a first host other than a M2M server associated with M2M communications.

WO 2013015994 A1, titled: "MONITORING MOBILE APPLICATION ACTIVITIES FOR MALICIOUS TRAFFIC ON A MOBILE DEVICE", discloses systems and methods for monitoring mobile application activities for malicious traffic on a mobile device. One embodiment of a method which can be implemented on a system includes, monitoring application activities of a mobile application on the mobile device, detecting, from the application activities, suspicious activity, and/or blocking traffic from which the suspicious activity is detected.

EP 1282283 A2, titled: "MALWARE SCANNING USING A NETWORK BRIDGE" discloses a network bridge that has an associated malware scanner that serves to concatenate portions of a data file from within data packets intercepted by the network bridge and then scan the data file concerned before the data file is forwarded to its intended recipient by the network bridge. The network bridge may be inserted in a network topology without requiring significant network configuration changes. The network bridge may include a packet analysis unit that serves to intercept only data packets having a predetermined network layer protocol or a predetermined application layer protocol.

U.S. Pat. No. 6,292,862 B1, titled: "BRIDGE MODULE" discloses a bridge module that is connected between at least two bus systems and is suitable for serial data transfer of binary data from one of the bus systems to the other one of the bus systems. A single memory device is provided for buffer storage of the data during a data transfer. The data transfer, which is controlled exclusively by the data to be transmitted, is thus carried out in a simple manner and completely automatically, without the interposition of a processor unit.

However, none of the above prior art disclosures provide embedded detection and protection to an M2M communication enabled connected machine. Thus there is a long felt need for an embedded security bridge relaying communication between a Machine-to-Machine (M2M) wireless module and a connected machine's MPU, providing a system and method capable of detecting and preventing cyber-attacks from a machine without human interaction.

SUMMARY OF THE INVENTION

The present invention provides an embedded security bridge (ESB), useful for machine to machine (M2M) communication cyber-attack detection and prevention, the ESB operatively connected to: (a) at least one proximal machine; and, (b) at least one M2M module, the M2M module is further in communication with at least one remote machine, the M2M module is configured to enable communication between at least one remote machine and at least one proximal machine through the ESB; the ESB comprises: (a) one or more inspection units, configured for analysis of the communication for identifying communication and/or content suspicious as malicious; and, (b) one or more decision units operatively connected to the inspection unit, the decision unit is configured to perform at least one action based on the analysis of at least one inspection unit; wherein the ESB is configured to detect by means of the inspection unit and prevent by means of the decision unit cyber-attacks on the proximal machine, the remote machine, or both.

It is another object of the current invention to disclose the ESB as defined in any of the above, wherein the ESB is configured to detect and prevent at least one of the following activities, by means of said inspection unit and said decision unit: (a) unauthorized use of at least one said remote machine, said proximal machine or both; (b) unauthorized access to said communication; (c) hijacking of at least a portion of said communication session; (d) communication timing attacks; (e) information attacks; (f) credentials attacking; (g) configuration attacks; (h) attacks against said proximal machine; (i) attack on the core network; and, (j) user data and/or identity attacks.

It is another object of the current invention to disclose the ESB as defined in any of the above, wherein at least a portion of the SBS is implemented into the proximal machine.

It is another object of the current invention to disclose the ESB as defined in any of the above, wherein the ESB further comprises one or more communication handler unit configured for communication with both at least one proximal machine's main processing unit (MPU) and the ESB.

It is another object of the current invention to disclose the ESB as defined in any of the above, wherein the ESB is implemented in at least one of the following ways: (a) externally connected between the proximal machine's MPU and the M2M module; (b) embedded in the proximal machine; and, (c) embedded in the M2M module.

It is another object of the current invention to disclose the ESB as defined in any of the above, wherein the inspection unit is configured to analyze the communication by at least one of the following: (a) inspection of at least one communication packet content; (b) validation of the identity and authenticity of the communication originator; and, (c) verification of at least one characteristic of the network environment serving the M2M module.

It is another object of the current invention to disclose the ESB as defined in any of the above, wherein at least one inspection unit actively interrogates the M2M module for at least one characteristic of its serving network environment.

It is another object of the current invention to disclose the ESB as defined in any of the above, wherein at least one action, performed by at least one decision unit, is selected from the following: (a) forwarding the communication on to at least one remote machine or the proximal machine; (b) block at least a portion of the communication; (c) alter at least a portion of the content and/or at least a portion of at least one communication packet before relaying it to at least one remote machine or the proximal machine; (d) generate an alert; and, (e) send a trigger to at least one of the following: at least one proximal machine, at least one remote machine, and, a third party.

It is another object of the current invention to disclose the ESB as defined in any of the above, wherein the decision unit is configured to generate at least one event, the event comprising at least one of the following: the analysis of the inspection unit, the communication details, and the action performed by the decision unit, further wherein the event is logged by the decision unit.

It is another object of the current invention to disclose the ESB as defined in any of the above, wherein the decision unit is configured to select the action performed based on a security policy.

It is another object of the current invention to disclose the ESB as defined in any of the above, wherein the security policy is applied according to the inspection unit analysis of at least one of the following: (a) current communication packet; (b) at least one previously received communication packet; and, (c) at least one combination of a series of communication packets received.

It is another object of the current invention to disclose the ESB as defined in any of the above, wherein the security policy is selected from a group consisting of: predefined, adjustable, self-learning, and any combination thereof.

It is another object of the current invention to disclose the ESB as defined in any of the above, wherein the M2M module comprises one or more connection interface to the network that is wireless, physical, or both.

It is another object of the current invention to disclose the ESB as defined in any of the above, wherein the M2M wireless network comprises one or more of the following: (a) cellular network; (b) Wi-Fi network; (c) satellite communication network; (d) ad-hoc point-to-point wireless communication; (e) acoustic transmissions; (f) near field communication (NFC); (g) RFID; (h) blue tooth network; (i) ZigBee; and, (g) WiMAX.

The present invention provides an embedded security bridge system (SBS) for machine to machine (M2M) communication cyber-attack detection and prevention, comprising: (a) one or more M2M module in communication with at least one remote machine, the M2M module configured for enabling communication between at least one remote machine and at least one first proximal machine; (b) at least one embedded security bridge (ESB) the ESB operatively connected to: (i) at least one proximal machine; and, (ii) at least one M2M module, the ESB comprises: (i) one or more inspection units, configured for analysis of the communication for identifying communication and/or content suspicious as malicious; and, (ii) one or more decision units operatively connected to the inspection unit, the decision unit is configured to perform at least one action based on the analysis of at least one inspection unit; wherein the M2M module is configured to enable communication between at least one first proximal machine and at least one second remote machine through the ESB; further wherein the ESB is configured to detect by means of the inspection unit and prevent by means of the decision unit cyber-attacks on the proximal machine, the remote machine, or both.

It is another object of the current invention to disclose the SBS as defined in any of the above, wherein the ESB is configured to detect and prevent at least one of the following activities by means of the inspection unit and the decision unit: (a) unauthorized use of at least one remote machine, proximal machine or both; (b) unauthorized access to the communication; (c) hijacking of at least a portion of the communication session; (d) communication timing attacks; (e) information attacks; (f) credentials attacking; (g) configuration attacks; (h) attacks against the proximal machine; (i) attack on the core network; and, (j) user data and/or identity attacks.

It is another object of the current invention to disclose the SBS as defined in any of the above, wherein at least a portion of the SBS is implemented into the proximal machine.

It is another object of the current invention to disclose the SBS as defined in any of the above, wherein the ESB further comprises one or more communication handler unit configured for communication with both at least one proximal machine's main processing unit (MPU) and the ESB.

It is another object of the current invention to disclose the SBS as defined in any of the above, wherein the ESB is implemented in at least one of the following ways: (a) externally connected between the proximal machine's MPU and the M2M module; (b) embedded in the proximal machine; and, (c) embedded in the M2M module.

It is another object of the current invention to disclose the SBS as defined in any of the above, wherein the inspection unit is configured to analyze the communication by at least one of the following: (a) inspection of at least one communication packet content; (b) validation of the identity and authenticity of the communication originator; and, (c) verification of at least one characteristic of the network environment serving the M2M module.

It is another object of the current invention to disclose the SBS as defined in any of the above, wherein at least one inspection unit actively interrogates the M2M module for at least one characteristic of its serving network environment.

It is another object of the current invention to disclose the SBS as defined in any of the above, wherein at least one action, performed by at least one decision unit, is selected from the following: (a) forwarding the communication on to at least one remote machine or the proximal machine; (b) block at least a portion of the communication; (c) alter at least a portion of the content and/or at least a portion of at least one communication packet before relaying it to at least one remote machine or the proximal machine; (d) generate an alert; and, (e) send a trigger to at least one of the following: at least one proximal machine, at least one remote machine, and, a third party.

It is another object of the current invention to disclose the SBS as defined in any of the above, wherein the decision unit is configured to generate at least one event, the event comprising at least one of the following: the analysis of the inspection unit, the communication details, and the action performed by the decision unit, further wherein the event is logged by the decision unit.

It is another object of the current invention to disclose the SBS as defined in any of the above, wherein the decision unit is configured to select the action performed based on a security policy.

It is another object of the current invention to disclose the SBS as defined in any of the above, wherein the security policy is applied according to the inspection unit analysis of at least one of the following: (a) current communication packet; (b) at least one previously received communication packet; and, (c) at least one combination of a series of communication packets received.

It is another object of the current invention to disclose the SBS as defined in any of the above, wherein the security policy is selected from a group consisting of: predefined, adjustable, self-learning, and any combination thereof.

It is another object of the current invention to disclose the SBS as defined in any of the above, wherein the M2M module comprises one or more connection interface to the network that is wireless, physical, or both.

It is another object of the current invention to disclose the SBS as defined in any of the above, wherein the M2M wireless network comprises one or more of the following: (a) cellular network; (b) Wi-Fi network; (c) satellite communication network; (d) ad-hoc point-to-point wireless communication; (e) acoustic transmissions; (f) near field communication (NFC); (g) RFID; (h) blue tooth network; (i) ZigBee; and, (j) WiMAX.

The present invention provides a method for machine to machine (M2M) communication cyber-attack detection and prevention, the method characterized by the following steps: (a) providing at least one embedded security bridge (ESB), useful for machine to machine (M2M) communication cyber-attack detection and prevention, the ESB operatively connected to: (i) at least one proximal machine; and, (ii) at least one M2M module, the M2M is further in communication with at least one remote machine, the M2M module is configured to enable communication between at least one remote machine and at least one proximal machine through the ESB; the ESB comprising: (i) one or more inspection units, configured for analysis of the communication for identifying communication and/or content suspicious as malicious; and, (ii) one or more decision units operatively connected to the inspection unit, the decision unit is configured to performing at least one action based on the analysis of at least one inspection unit; (b) receiving communication originating from the proximal machine or the remote machine through the ESB; (c) analyzing the communication by the inspection unit for identifying communication and/or content suspicious as malicious; and, (d) performing at least one action by the decision unit based on the analysis of the communication and/or content by the inspection unit.

It is another object of the current invention to disclose the method as defined in any of the above, additionally comprising the step of the ESB detecting and preventing at least one of the following activities by means of the inspection unit and the decision unit: (a) unauthorized use of at least one remote machine, proximal machine or both; (b) unauthorized access to the communication; (c) hijacking of at least a portion of the communication session; (d) communication timing attacks; (e) information attacks; (f) credentials attacking; (g) configuration attacks; (h) attacks against the proximal machine; (i) attack on the core network; and, (j) user data and/or identity attacks.

It is another object of the current invention to disclose the method as defined in any of the above, additionally comprising the step of providing the ESB at least partly implemented into the proximal machine.

It is another object of the current invention to disclose the method as defined in any of the above, additionally comprising the step of further providing one or more communication handler unit operatively connected for communication with both at least one proximal machine's main processing unit (MPU) and the ESB.

It is another object of the current invention to disclose the method as defined in any of the above, additionally comprising the step of providing the ESB implemented in at least one of the following ways: (a) externally connected between the proximal machine's MPU and the M2M module; (b) embedded in the proximal machine; and, (c) embedded in the M2M module.

It is another object of the current invention to disclose the method as defined in any of the above, additionally comprising the step of configuring the inspection unit to analyzing the communication by at least one of the following: (a) inspecting of at least one communication packet content; (b) validating of the identity and authenticity of the communication originator; and, (c) verifying of at least one characteristic of the network environment serving the M2M module.

It is another object of the current invention to disclose the method as defined in any of the above, additionally comprising the step of the inspection unit actively interrogating the M2M module for at least one characteristic of its serving network environment.

It is another object of the current invention to disclose the method as defined in any of the above, additionally comprising the step of the decision unit performing at least one of the following actions: (a) forwarding the communication on to at least one machine; (b) blocking the communication; (c) deleting the communication; (d) altering at least a portion of the content and/or at least a portion of at least one communication packet before relaying it to at least one remote machine or the proximal machine; (e) generating an alert; and, (f) sending a trigger to at least one of the following: at least one proximal machine, at least one remote machine, and, a third party.

It is another object of the current invention to disclose the method as defined in any of the above, additionally comprising the step of the decision unit configuring an event comprising at least one of the following: the analysis of the inspection unit, the communication details, and the action performed by the decision unit, further wherein the event is logged by the decision unit.

It is another object of the current invention to disclose the method as defined in any of the above, additionally comprising the step of the decision unit determining the action performed based on a security policy.

It is another object of the current invention to disclose the method as defined in any of the above, additionally comprising the step of applying the security policy according to at least one of the following: (a) current communication packet; (b) at least one previously received communication packet; and, (c) at least one combination of a series of communication packets received.

It is another object of the current invention to disclose the method as defined in any of the above, additionally comprising the step of selecting the security policy from a group consisting of: predefined, adjustable, self-learning, and any combination thereof.

It is another object of the current invention to disclose the method as defined in any of the above, additionally comprising the step of providing the M2M module comprising a connection interface to the network that is wireless, physical, or both.

It is another object of the current invention to disclose the method as defined in any of the above, additionally comprising the step of providing the wireless network comprising one or more of the following: (a) cellular network; (b) Wi-Fi network; (c) satellite communication network; (d) ad-hoc point-to-point wireless communication; (e) acoustic transmissions; (f) near field communication (NFC); (g) RFID; (h) blue tooth network; (i) ZigBee; and, (j) WiMAX.

BRIEF DESCRIPTION OF THE FIGURES

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured. In the accompanying drawing:

DETAILED DESCRIPTION OF THE PREFERRED EMBODIMENTS

Figure 1:
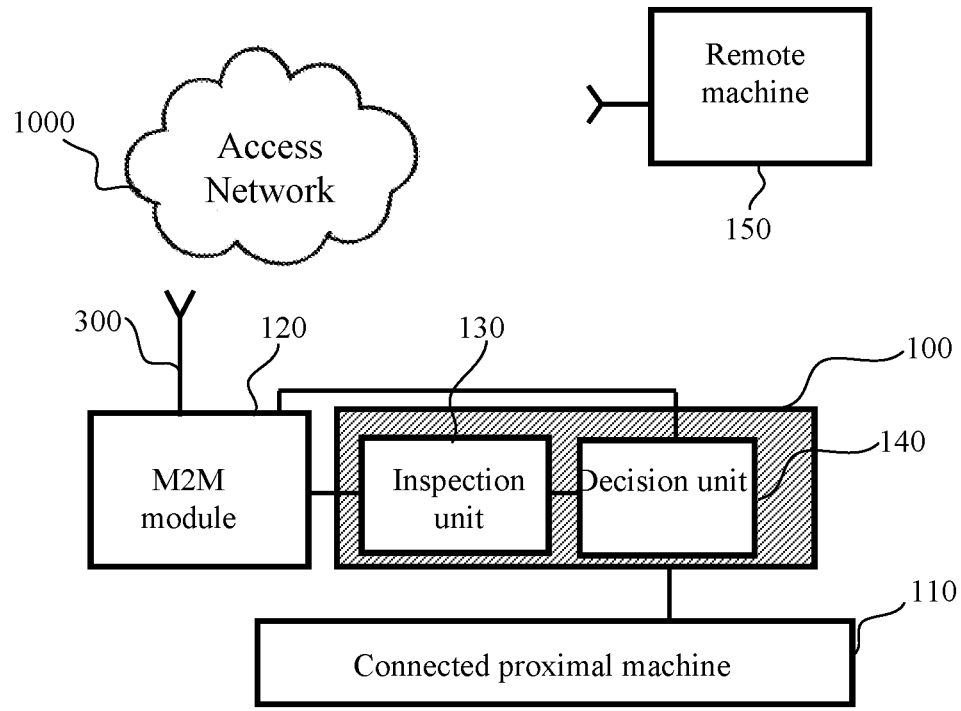
FIG. 1 is a schematic out of scale illustration of an ESB, connected to a proximal machine and to an M2M module in connection with a remote machine though at least one access network.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

The essence of the present invention is to provide an embedded security bridge (ESB), useful for machine to machine (M2M) communication cyber-attack detection and prevention, the ESB operatively connected to: at least one proximal machine and, to at least one M2M module. The M2M is operably in communication with the proximal machine through the security bridge and operably in communication with at least one remote machine. The ESB includes: one or more inspection units, configured for analysis of the communication for identifying communication and/or content suspicious as malicious, and, one or more decision units operatively connected to the inspection unit. The decision unit is configured to perform at least one action based on the analysis of at least one inspection unit. The ESB is configured to detect by means of the inspection unit and prevent by means of the decision unit cyber-attacks on the proximal machine, at least one remote machine, or both.

Further, the essence of the present invention is to provide an embedded security bridge system (SBS) for machine to machine (M2M) communication cyber-attack detection and prevention, comprising: one or more M2M module in communication with at least one remote machine, the M2M module configured for enabling communication between at least one remote machine and at least one first proximal machine, and, at least one embedded security bridge (ESB). The ESB is operatively connected to at least one proximal machine, and, to at least one M2M module. The ESB comprises: one or more inspection units, configured for analysis of the communication for identifying communication and/or content suspicious as malicious; and, one or more decision units operatively connected to the inspection unit, the decision unit is configured to perform at least one action based on the analysis of at least one inspection unit. The M2M module is configured to enable communication between at least one first proximal machine and at least one second remote machine through the ESB. Further, the ESB is configured to detect by means of the inspection unit and prevent by means of the decision unit cyber-attacks on the proximal machine, at least one remote machine, or both.

It is further yet the essence of the present invention to provide a method for machine to machine (M2M) communication cyber-attack detection and prevention, by using an ESB, or an SBS.

The term "machine to machine communication" or 'M2M communication', refers hereinafter to any communication between at least two machines (electronic and/or mechanical devices) that does not need human intervention and/or supervision. The communication can be interactive information interchange, unidirectional transmission in either direction, or any combination of both. Further, the communication can be between machines of the same or different types.

The term "bridge", refers hereinafter to a communication device used to relay communication between two or more other devices.

Additionally or alternatively, the M2M module establishes communication through at least one machine trusted environment (TRE).

The term "validation" refers hereinafter to the ability to technically asses the state of a system and/or communication for all security relevant properties. This can be assessing the origin of the data from the proximal machine that is validated as these non-limiting examples: manufacture details of the device, initial deployment, maintenance history, configuration change history, examination that the proximal machine's autonomous verification has been successfully completed, a validation can result from the successful exchange of encryption keys, authentication tokens and codes, as known in the art.

The term "M2M module", refers hereinafter to a wireless communication device enabling communication between two or more remotely stationed machines. The M2M module usually communicates over cellular network such as GSM, CDMA, UMTS and etc. Additionally or alternatively, the M2M wireless communication can be in a cellular M2M architecture or capillary M2M architecture. Cellular M2M architecture refers to a model where each M2M proximal (connected machine) is directly connected to a network (e.g. a cellular network). Capillary M2M architecture refers to a model in which M2M terminals (proximal machines) in a defined area are connected by a capillary network in a mesh like or tree topology to one gateway enabling a network (e.g. cellular network) connection. The gateway can impose further inspection, transformation and/or manipulation of the data. Additionally or alternatively, the M2M module can communicate over any network such as these non-limiting examples: satellite communication, cellular network, internet, WAN, WLAN, VPN, and etc.

The term "proximal machine" or "terminal", refers hereinafter to any machine that is operatively connected to at least one embedded security bridge and passes at least a portion of a communication therethrough and to an M2M module to connect to at least one second remote machine, such as these non-limiting examples: a vending machine, a monitoring device, a gate controller, a sensor, a medical device, a meter, any production machine, 3D printer, a camera, an electronic lock, an ATM, a tracking device (e.g. real time parcel tracking), point of sale data providing devices, a computer, a PDA, a cellular phone and etc.

The term "Main Processing Unit" or "MPU", refers hereinafter to the proximal machine's main processing hardware and software.

The term "wireless network interface" refers herein to a connection of a computer to the wireless network media over which transmissions are sent and received.

The term "access network", refers hereinafter to the medium used to convey communication packets between the proximal machine and the remote machine. As non-limiting examples the network can be such as WAN (wide area network), Internet, LAN (local area network), MAN (metro area network), VLAN (Virtual Local Area Network), PAN (Personal Area Network), VPN (Virtual Private Network), etc., utilizing such as these non-limiting examples: cellular network, cellular network, Wi-Fi network, satellite communication network, ad-hoc point-to-point wireless communication, acoustic transmissions, near field communication (NFC), RFID, blue tooth network; ZigBee, WiMAX, and etc.

The term "packet", or "communication packet" refers herein to one unit of binary data capable of being communicated through a computer network. To improve communication performance and reliability, each message sent between two network devices is often subdivided into packets by the underlying hardware and software. Depending on the protocol, packets are usually constructed in some standard format determining their boundaries, origin and destination.

The term "cyber-attack" refers herein to any attempted damage, unauthorized use or unauthorized access to M2M communication or machines. This includes, as non-limiting examples:

Unauthorized use of at least one machine, unauthorized access to a communication.

Hijacking of at least a portion of a communication session.

Communication timing attacks—such as delaying at least one communication packet, changing the order of forwarding at least one communication packets, and others as known in the art.

Information attacks—leaking of at least a portion of information, false representation of at least a portion of the data, disruption, change, erasing at least a portion of the packet format, or information, changing the origin or destination of the at least apportion of the communication, creating false communication, copying at least a portion of the information communicated.

Credentials attacking—such as malicious cloning of authentication tokens, attack on authentication tokens, sending false validations, and others as known in the art.

Configuration attacks—such as false software update, false change in configuration, changing the access control, and others as known in the art.

Attacks against the proximal machine—such as preventing at least one machine from operating normally, propagation of malicious code (e.g. virus or worm), physical attacks—such as forcing rebooting, re-flashing booting modified software, and others as known in the art.

Attack on the core network—such as traffic tunneling between impersonated devices, misconfiguration of the firewall in the gateway or router/modem, using a rogue device, propagation of malicious code (e.g. virus or worm), submitting multiple requests in an intention to overload the server or another service providing machine, overloading the communication network, and others as known in the art.

User data and identity attacks—such as impersonation of a device, retrieval of information of a specific user or a specific machine, changing the access of users to the system, and others as known in the art.

The term "communication details" interchangeably refers herein to any data associated with a communication such as these non-limiting examples: date, time, duration of the communication, at least a portion of the content, type of data communicated, format of the communication, amount of data packets, whether the communication is unilateral or bilateral, communication origin, communication destination, communication routing history, communication protocol, number of times the same communication has been received/transmitted, rank of communication in an chronological order of communications, and any combination thereof.

The term "security policy" interchangeably refers herein to one or more requirement or rule, usually a set, determining the handling of communication by the ESB. Additionally or alternatively, the security policy can be predefined, modified, updated by a self-learning system, and any combination thereof. Additionally or alternatively, dedicated security systems can be incorporated in different ESBs according to each system specifications. The security policy can be configured to apply to all the communication received, transmitted or both, or to one or more communication packets. Additionally or alternatively, different security policies can be applied according to any of the communication details. The security policy is configured to detect and prevent cyber-attacks.

The serving network environment comprises at least a portion of a wireless network environment, and usually is completely based on wireless communication. The characteristic of the wireless environment can vary from the communication protocols used, frequencies used, type of data transferal over these frequencies, signal properties (e.g. signal to noise ratio, signal intensity and etc.) major network station used, origin of transmission, encryption types, any one or more of the communication details, and the like, as known in the art.

The SBS or any parts and portions thereof including connected modules thereto, can be implemented as a hardware circuit board and/or chip including as non-limiting examples a one-way data transferring component, a one-time programmable component, an encryption module, and any combination thereof.

Reference is now made to FIG. 1, schematically representing in an out of scale manner an embodiment of the invention. An embedded security bridge (ESB) (100), useful for machine to machine (M2M) communication cyber-attack detection and prevention, the ESB operatively connected to at least one (110) proximal machine; and, at least one M2M module (120). The M2M is further in communication with at least one remote machine (150), via an access network (1000). The M2M module (120) is configured to enable communication between at least one remote machine (150) and at least one proximal machine (110) through the ESB (100). The communication can be transmitted wirelessly by acoustic transmission, RF electromagnetic waves transmission, Wi-Fi, RFID, blue tooth network, ZigBee, WiMAX, and etc., and/or physically through such as data wires, optical cables, electrically conductive material, and etc. The ESB (100) includes one or more inspection units (130), configured for analysis of the communication for identifying communication and/or content suspicious as malicious; and, one or more decision units (140) operatively connected to the inspection unit, the decision unit is configured to perform at least one action based on the analysis of at least one inspection unit. Further, the ESB (100) is configured to detect by means of the inspection unit and prevent by means of the decision unit cyber-attacks on the proximal machine, at least one remote machine, or both. The ESB (100) is configured to detect and prevent at least one of the following activities: (a) unauthorized use of at least one remote machine, proximal machine, or both; (b) unauthorized access to at least a portion of at least one remote machine, proximal machine, or both; (c) false representation of at least a portion of the communication; (d) false forwarding of at least a portion of at least one communication; (e) including malicious code in at least a portion of the communication; (f) cloning and multiplying the communication; (g) preventing at least one remote machine, proximal machine, or both, from operating normally; (h) hijacking of at least a portion of the communication; (i) leaking of at least a portion of information from at least one remote machine, proximal machine, or both; (j) changing the configuration of at least one remote machine, proximal machine, or both; (k) changing at least a portion of the communication selected from a group consisting of: content, origin data, destination, protocol format, and any combination thereof; and, (l) deleting at least a portion of the communication.

According to another embodiment of the invention, an ESB as defined above is disclosed, wherein the ESB is configured to detect and prevent at least one of the following activities by means of the inspection unit and the decision unit: (a) unauthorized use of at least one remote machine, proximal machine or both; (b) unauthorized access to the communication; (c) hijacking of at least a portion of the communication session; (d) communication timing attacks; (e) information attacks; (f) credentials attacking; (g) configuration attacks; (h) attacks against the proximal machine; (i) attack on the core network; and, (j) user data and identity attacks.

In yet another embodiment of the invention, an ESB as defined above is disclosed, wherein the ESB is configured to detect and prevent hijacking of at least a portion of the communication session. Communication hijacking, can be, as a non-limiting example impersonating a cellular communication transmission cell, by for example forging the cellular cell signature, and sending a malicious communication from an external source (not originating from at least one remote machine). In this example, the ESB is configured to detect the communication hijacking by examining any one or more of the Serving Cell identity, type of communication originated from that cell, network information provided by that cell, network information gathered from other network cells, signal measurements either provided by the serving cell or independently measured by the M2M module, and any other characteristic of the wireless environment, as known in the art. Additionally or alternatively, the detection is made by actively interrogating the network for one or more characteristic of the network environment and communication means and methods, such as: the communication protocols used, frequencies used, type of data transferal over these frequencies (e.g. frequency hopping, time portion based), major network station used, origin of transmission, encryption types, which cellular cells were used during communication routing, analyzing the communication signal properties such as the signal to noise ratio in comparison to previous communication, and the like, as known in the art. The ESB is configured to prevent the detected malicious communication from reaching and/or reaching in its original form, at least one remote machine and/or at least one proximal machine by such as: deleting at least a portion of the communication, forwarding the communication to a different recipient, rewriting/modifying at least a portion of the communication (e.g. communication content, signature, encryption, encryption signature, a portion of the packet content, a portion of the packet frame, and etc.) before forwarding it to at least one recipient. Additionally or alternatively, the inspection and detection is performed by inspecting more than one communication packet, also analyzing the order, connection, and/or timing between communication packets.

According to another embodiment of the invention, an ESB as defined above is disclosed, wherein the ESB is configured to detect and prevent at least one of the following activities: (a) unauthorized use of at least one remote machine, the proximal machine, or both; (b) unauthorized access to at least a portion of at least one remote machine, the proximal machine, or both; (c) false representation of at least a portion of the communication; (d) false forwarding of at least a portion of at least one communication packet; (e) including malicious code in at least a portion of the communication; (f) cloning and multiplying at least a portion of the communication; (g) preventing at least one remote machine, proximal machine, or both, from operating normally; (h) hijacking of at least a portion of the communication; (i) information leakage from at least one remote machine, the proximal machine, or both; (j) configuration change of at least one remote machine, the proximal machine, or both; (k) changing at least a portion of the communication selected from a group consisting of: content, origin data, destination data, protocol format, and any combination thereof; (l) deleting at least a portion of the communication; (m) delaying at least one communication packet; and, (n) changing the order of at least one communication packet.

According to another embodiment of the invention, an ESB as defined above is disclosed, wherein at least a portion of the SBS is implemented into the proximal machine.

According to another embodiment of the invention, an ESB as defined above is disclosed, wherein at least a portion of the M2M module is implemented into the ESB, the proximal machine, or both.

According to another embodiment of the invention, an ESB as defined above is disclosed, wherein the ESB further comprises one or more communication handler unit configured for communication with both at least one proximal machine's main processing unit (MPU) and the ESB.

According to another embodiment of the invention, an ESB as defined above is disclosed, wherein the ESB is implemented in at least one of the following ways: (a) externally connected between the proximal machine's MPU and the M2M module; (b) embedded in the proximal machine; and, (c) embedded in the M2M module.

According to another embodiment of the invention, an ESB as defined above is disclosed, wherein the inspection unit is configured to analyze the communication by at least one of the following: (a) inspection of at least one communication packet content; (b) validation of the identity and authenticity of the communication originator; and, (c) verification of at least one characteristic of the network environment serving the M2M module.

According to another embodiment of the invention, an ESB as defined above is disclosed, wherein at least one inspection unit actively interrogates the M2M module for at least one characteristic of its serving network environment.

According to another embodiment of the invention, an ESB as defined above is disclosed, wherein at least one decision unit performs at least one of the following actions: (a) forwarding the communication on to at least one remote machine or the proximal machine; (b) block at least a portion of the communication; (c) alter at least a portion of the content and/or at least a portion of at least one communication packet before relaying it to at least one remote machine or the proximal machine; (d) generate an alert; and, (e) send a trigger to at least one of the following: at least one proximal machine, at least one remote machine, and, a third party.

The term "a third party" in reference to a recipient of at least one trigger sent by the ESB interchangeably refers herein to such as these non-limiting examples: a computer, a terminal, a phone, a cellular phone, a PDA, an E-mail, a visual alarm (lights, any physical difference observed visually), an audible alarm, a sensible alarm, a server, a security system, an administer, and etc.

Additionally or alternatively, the action is determined according to an output received by the inspection unit.

According to another embodiment of the invention, an ESB as defined above is disclosed, wherein the decision unit is configured to generate at least one event, the event comprising at least one of the following: the analysis of the inspection unit, the communication details, and the action performed by the decision unit, further wherein the event is logged by the decision unit.

According to another embodiment of the invention, an ESB as defined above is disclosed, wherein the decision unit is configured to select the action performed based on a security policy.

According to another embodiment of the invention, an ESB as defined above is disclosed, wherein the security policy is applied according to the inspection unit analysis of at least one of the following: (a) current communication packet; (b) at least one previously received communication packet; and, (c) at least one combination of a series of communication packets received.

According to another embodiment of the invention, an ESB as defined above is disclosed, wherein the security policy is selected from a group consisting of: predefined, adjustable, self-learning, and any combination thereof.

Additionally or alternatively, the inspection unit is configured to generate at least one output, signifying at least partly the results of the inspection and/or analysis of the communication received. The inspection is of at least a portion of the communication, as non-limiting examples, the inspection can be of any level of implementation of the communication received, such as the application level, the transport level, the data link level, the internet level and etc. further the inspection can be of one or more packets, at least a portion of a packet (the address, the header, the content, at least a portion of the frame, and etc. Additionally or alternatively, the inspection unit will compare at least a portion of the communication received to predefined examples and/or templates of data known to be malicious. Additionally or alternatively, the inspection unit will detect patterns within at least a portion of the communication that are indicative of portions suspected to be malicious. Additionally or alternatively, the inspection unit will compare at least a portion of the communication and/or at least a portion of the communication properties to information retrieved in real time of the network characteristics, of the communication origin, of the expected communication other portions, of the packet number, of the communication protocol, and of the communication routing.

Additionally or alternatively, according to the results of the inspection unit analysis, embodied as at least one output, a decision will be made by the decision unit, according to a set of rules, providing a security policy, as to the next step in handling the communication received. As a non-limiting example, an output from the inspection unit is at least one of the following: suspected as malicious, not suspected as malicious, the level of threat estimated by the inspection unit, the implementation level in which the data suspected as malicious is found, the type of irregularity detected suspected as malicious, the number of these irregularities detected, and the location within the packet of the portion suspected as malicious.

Additionally or alternatively, the security policy is employed to determine which action is performed by the decision unit; this can be such as these non-limiting examples: if a communication is suspected as malicious by the inspection unit at a high level of probability (calculated by the ESB), the rule from the security policy will cause the communication to be deleted, and/or an event to be generated. Another example can be in the case of suspected malicious content in the level of the address of the communication the security policy can generate an action of rewriting at least a portion of the communication before forwarding the communication and/or generate an alarm. Another example is if a series of communication packets is suspected as malicious, the rule from the security policy can determine to generate blocking of these communications. Another example can be when at least a portion of a communication is suspected as malicious, and the output from the inspection unit includes a low probability value for the data to be malicious, the security policy rule can determine to generate the forwarding of that communication to at least one machine.

According to another embodiment of the invention, an ESB as defined above is disclosed, wherein the M2M module comprises one or more connection interface to the network that is wireless, physical, or both.

According to another embodiment of the invention, an ESB as defined above is disclosed, wherein the M2M wireless network comprises one or more, but not limited to, of the following: (a) cellular network; (b) Wi-Fi network; (c) satellite communication network; (d) ad-hoc point-to-point wireless communication; (e) acoustic transmissions; (f) near field communication (NFC); (g) RFID; (h) blue tooth network; (i) ZigBee; and, (g) WiMAX. Additionally or alternatively, the network can be any medium configured to allow the passage of communication packets, and/or communication signals between at least two devices (such as a proximal machine and a remote machine). This, includes these non-limiting examples: optical communication, wireless communication, wired communication, acoustic communication, RF communication, chemically based communication, and etc., together with a protocol enabling such a communication.

Figure 2:
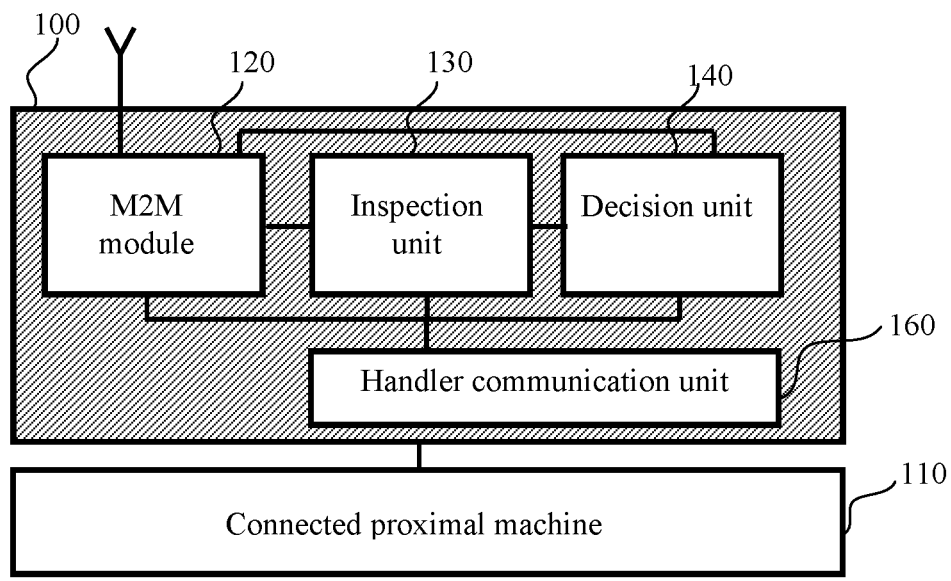
FIG. 2 is a schematic out of scale illustration of an ESB comprising an inspection unit, M2M module, communication handler unit and a decision unit.

Reference is now made to FIG. 2 illustrating in an out-of-scale manner an ESB (100) comprising an inspection unit (130), M2M module (120), communication handler unit (160) and a decision unit (140), operatively connected to the proximal machine (110). In this embodiment the ESB incorporates the M2M module for transmitting/receiving communication. Received communication is inspected by the inspection unit that produces an analysis to the decision unit. The decision unit employs at least one security policy and decides whether the information will be transmitted, received, modified, deleted, or any combination thereof by the M2M module. The ESB (100) is operatively connected to a communication handler unit (160). Additionally or alternatively, the communication handler unit (160) can be interconnected as a separable physical piece to the ESB (100). Additionally or alternatively, the communication handler unit (160) is configured to allow access to the ESB (100) or any operatively connected part or module, for a user or through an intermediate device in order to perform one or more of these non-limiting examples: change the configuration of the ESB, change security policy, retrieve information logs, execute hardware/software checkups, execute communication checkups to the proximal machine, the M2M module, the inspection unit, the decision unit, communication through the to/from remote machine and any combination thereof. In this embodiment, the communication is relayed through the ESB (100) comprising the M2M module (120) that is operatively connected to the inspection unit. The decision unit (140) is operatively connected to the inspection unit (130) and to the M2M module (120). The communication handler unit (160) is operatively connected to the M2M module (120), the inspection unit (130) and the decision unit (140). The ESB (100) is operatively connected to the proximal machine (110) thereto it transfers communication and therefrom it receives communication to be forwarded to at least one remote machine.

Additionally or alternatively, the decision unit is operatively connected to at least one of the following: the inspection unit, the M2M module, the ESB, the communication handler unit, the proximal machine, and any combination thereof.

Additionally or alternatively, the inspection unit is operatively connected to at least one of the following: the M2M module, the ESB, the communication handler unit, the proximal machine, the decision unit, and any combination thereof.

Figure 3:
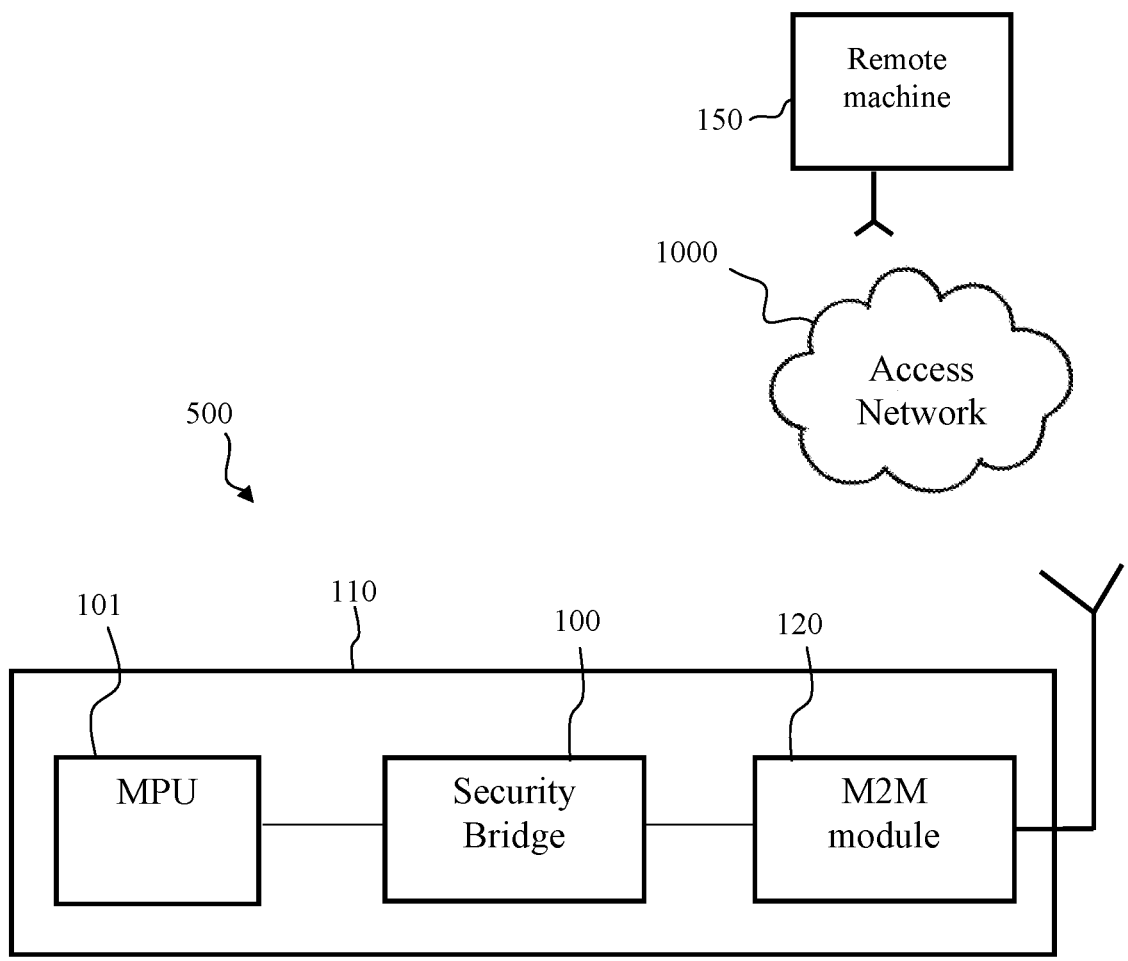
FIG. 3 is a schematic diagram of an SBS in which an ESB is configured to be integrated into a proximal machine, together with an M2M module.

Reference is now made to FIG. 3 illustrating a schematic diagram of an SBS (500) in which an ESB (100) is configured to be integrated into a proximal machine (110), operatively connected to the machine's main processing unit (MPU) (101), and to an M2M module receiving/transmitting all communication therethrough. All communication to the MPU is received by the M2M module, passed to the security bridge (100), and only then reaches the MPU (101). All communication transmitted from the MPU is passed through the security bridge to the M2M module that communicates it through an access network (1000) to at least one remote machine (150). Additionally or alternatively, the MPU is configured to receive, transmit or both, information from an additional port.

According to another embodiment of the invention, an SBS as defined above is disclosed, wherein the ESB is configured to detect and prevent at least one of the following activities by means of the inspection unit and the decision unit: (a) unauthorized use of at least one remote machine, proximal machine or both; (b) unauthorized access to the communication; (c) hijacking of at least a portion of the communication session; (d) communication timing attacks; (e) information attacks; (f) credentials attacking; (g) configuration attacks; (h) attacks against the proximal machine; (i) attack on the core network; and, (j) user data and identity attacks According to another embodiment of the invention, an SBS as defined above is disclosed, wherein the ESB is configured to detect and prevent at least one of the following activities: (a) unauthorized use of at least one remote machine, the proximal machine, or both; (b) unauthorized access to at least a portion of at least one remote machine, the proximal machine, or both; (c) false representation of at least a portion of the communication; (d) false forwarding of at least a portion of at least one communication packet; (e) including malicious code in at least a portion of the communication; (f) cloning and multiplying at least a portion of the communication; (g) preventing at least one remote machine, proximal machine, or both, from operating normally; (h) hijacking of at least a portion of the communication; (i) information leakage from at least one remote machine, the proximal machine, or both; (j) configuration change of at least one remote machine, the proximal machine, or both; (k) changing at least a portion of the communication selected from a group consisting of: content, origin data, destination data, protocol format, and any combination thereof; (l) deleting at least a portion of the communication; (m) delaying at least one communication packet; and, (n) changing the order of at least one communication packet.

According to another embodiment of the invention, an SBS as defined above is disclosed, wherein at least a portion of the SBS is implemented into the proximal machine.

According to another embodiment of the invention, an SBS as defined above is disclosed, wherein at least a portion of the M2M module is implemented into the ESB, the proximal machine, or both.

According to another embodiment of the invention, an SBS as defined above is disclosed, wherein the ESB further comprises one or more communication handler unit configured for communication with both at least one proximal machine's main processing unit (MPU) and the ESB.

According to another embodiment of the invention, an SBS as defined above is disclosed, wherein the ESB is implemented in at least one of the following ways: (a) externally connected between the proximal machine's MPU and the M2M module; (b) embedded in the proximal machine; and, (c) embedded in the M2M module.

According to another embodiment of the invention, an SBS as defined above is disclosed, wherein the inspection unit is configured to analyze the communication by at least one of the following: (a) inspection of at least one communication packet content; (b) validation of the identity and authenticity of the communication originator; and, (c) verification of at least one characteristic of the network environment serving the M2M module.

According to another embodiment of the invention, an SBS as defined above is disclosed, wherein at least one inspection unit actively interrogates the M2M module for at least one characteristic of its serving network environment.

According to another embodiment of the invention, an SBS as defined above is disclosed, wherein at least one decision unit performs at least one of the following actions: (a) forwarding the communication on to at least one remote machine or the proximal machine; (b) block at least a portion of the communication; (c) alter at least a portion of the content and/or at least a portion of at least one communication packet before relaying it to at least one remote machine or the proximal machine; (d) generate an alert; and, (e) send a trigger to at least one of the following: at least one proximal machine, at least one remote machine, and, a third party.

According to another embodiment of the invention, an SBS as defined above is disclosed, wherein the decision unit is configured to generate at least one event, the event comprising at least one of the following: the analysis of the inspection unit, the communication details, and the action performed by the decision unit, further wherein the event is logged by the decision unit.

According to another embodiment of the invention, an SBS as defined above is disclosed, wherein the decision unit is configured to select the action performed based on a security policy.

According to another embodiment of the invention, an SBS as defined above is disclosed, wherein the security policy is applied according to the inspection unit analysis of at least one of the following: (a) current communication packet; (b) at least one previously received communication packet; and, (c) at least one combination of a series of communication packets received.

According to another embodiment of the invention, an SBS as defined above is disclosed, wherein the security policy is selected from a group consisting of: predefined, adjustable, self-learning, and any combination thereof.

According to another embodiment of the invention, an SBS as defined above is disclosed, wherein the M2M module comprises one or more connection interface to the network that is wireless, physical, or both.

According to another embodiment of the invention, an SBS as defined above is disclosed, wherein the M2M wireless network comprises one or more, but not limited to, of the following: (a) cellular network; (b) Wi-Fi network; (c) satellite communication network; (d) ad-hoc point-to-point wireless communication; (e) acoustic transmissions; (f) near field communication (NFC); (g) RFID; (h) blue tooth network; (i) ZigBee; and, (j) WiMAX.

Figure 4:
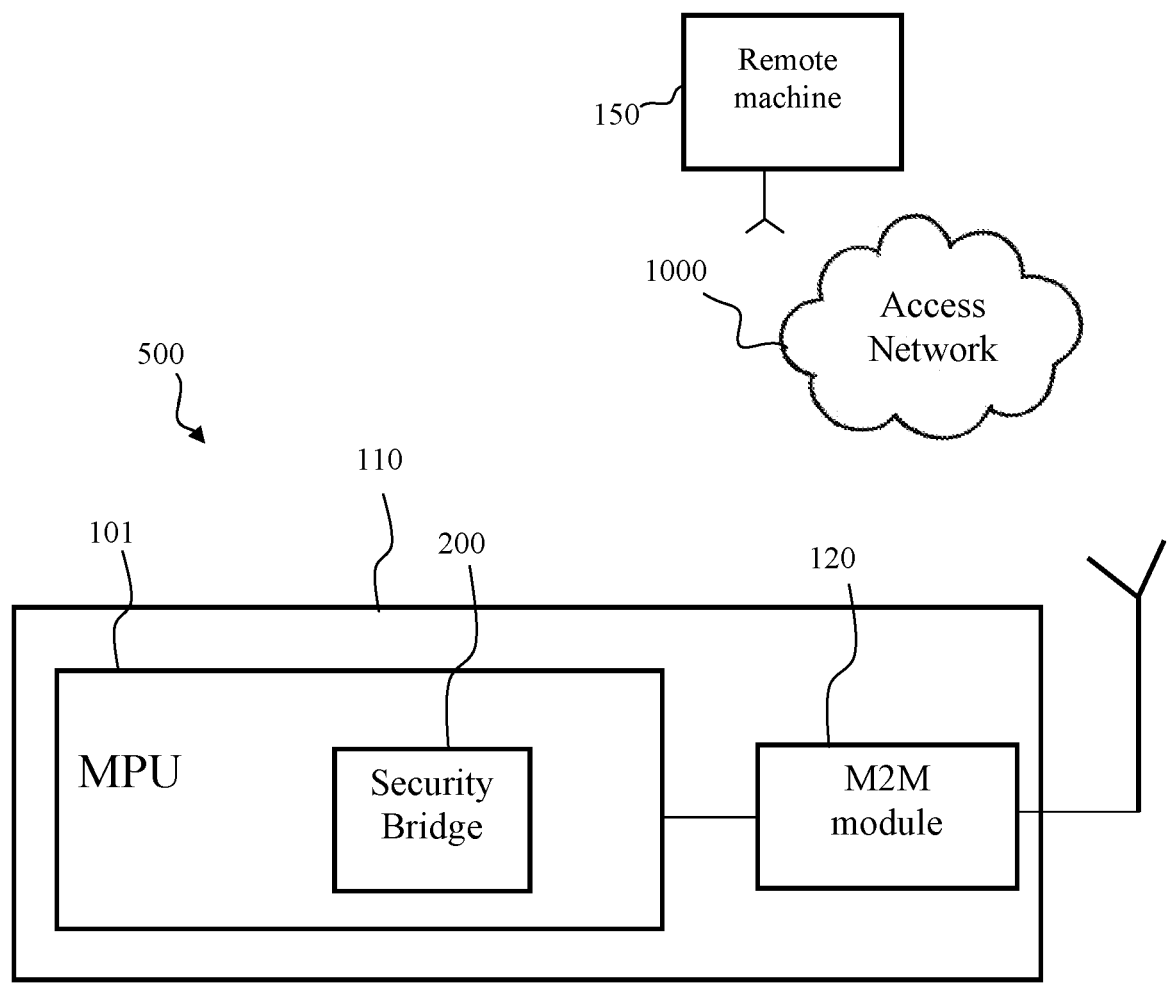
FIG. 4 is a schematic diagram of an SBS in which an ESB is configured to be integrated into a proximal machine MPU.

Reference is now made to FIG. 4 illustrating a schematic diagram of an SBS (500) in which an ESB (100) is configured to be integrated into a proximal machine (110) MPU (101). The M2M module (120) comprises a communication interface to the access network (1000), enabling the communication to reach at least one remote machine (150). The M2M module (120) is operatively connected to the MPU (101) incorporating at least one ESB (100), configured to detect and prevent cyber-attacks, by employing at least one security policy.

Figure 5:
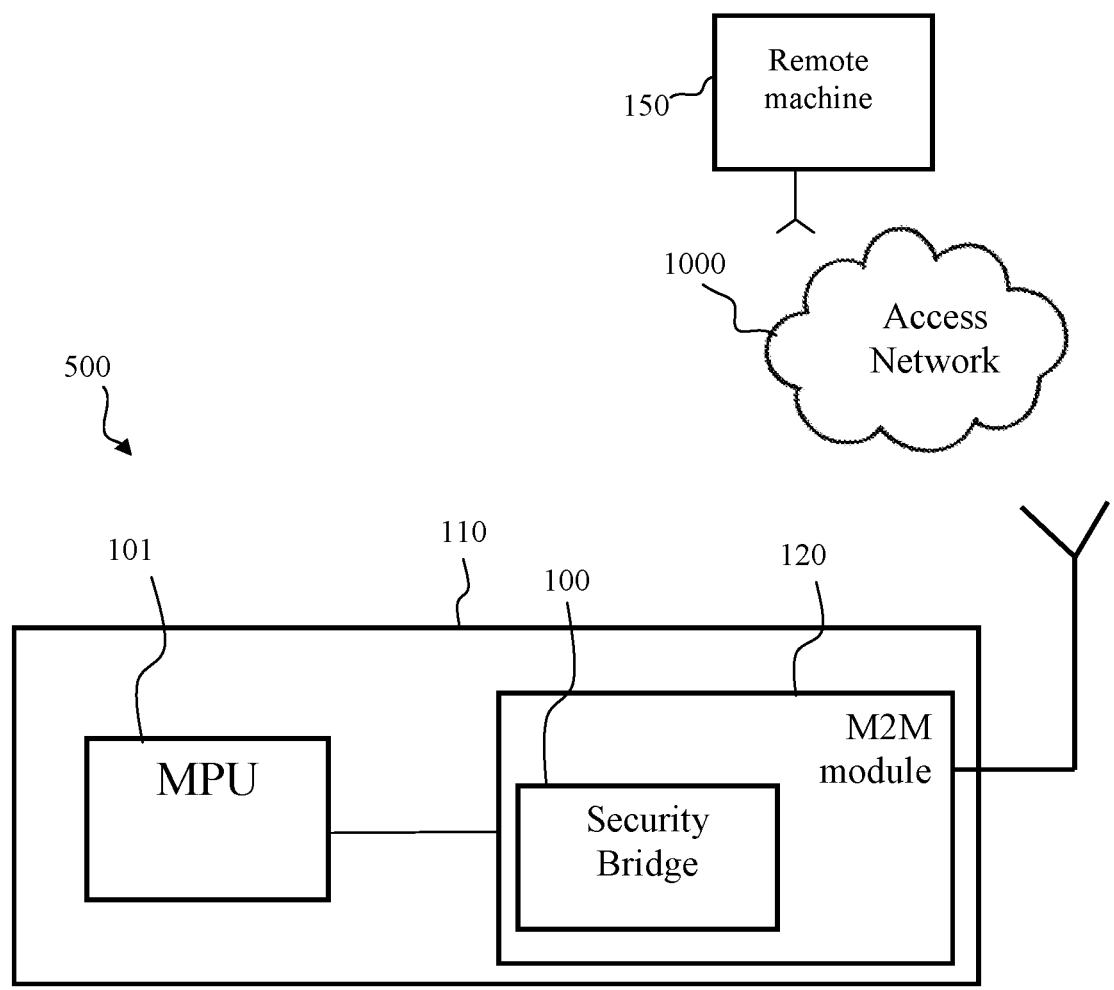
FIG. 5 is a schematic diagram of an SBS in which an ESB is configured to be integrated into an M2M module; and, FIG. 6 is a schematic diagram of a method for machine to machine (M2M) communication cyber-attack detection and prevention.

Reference is now made to FIG. 5 illustrating a schematic diagram of an SBS (500) comprising an ESB (100) configured to be integrated into an M2M module. The M2M module is configured to enable communication through an access network (1000) to at least one remote machine (150). Further the M2M module is operatively connected to a machine's MPU (101) functioning as a bridge for the passage of communication thereto and/or therefrom. Additionally or alternatively, the M2M module (120) comprising the ESB (100) is not integrated into the proximal machine (110) only operatively connected to it.

The present invention further discloses a method for machine to machine (M2M) communication cyber-attack detection and prevention, the method characterized by the following steps: (a) providing at least one embedded security bridge (ESB), useful for machine to machine (M2M) communication cyber-attack detection and prevention, the ESB operatively connected to: (i) at least one proximal machine; and, (ii) at least one M2M module, the M2M is further in communication with at least one remote machine, the M2M module is configured to enable communication between at least one remote machine and at least one proximal machine through the ESB; the ESB comprising: (i) one or more inspection units, configured for analysis of the communication for identifying communication and/or content suspicious as malicious; and, (ii) one or more decision units operatively connected to the inspection unit, the decision unit is configured to performing at least one action based on the analysis of at least one inspection unit; (b) receiving communication originating from the proximal machine or the remote machine through the ESB; (c) analyzing the communication by the inspection unit for identifying communication and/or content suspicious as malicious; and, (d) performing at least one action by decision unit based on the analysis of the communication and/or content by the inspection unit.

Figure 6:
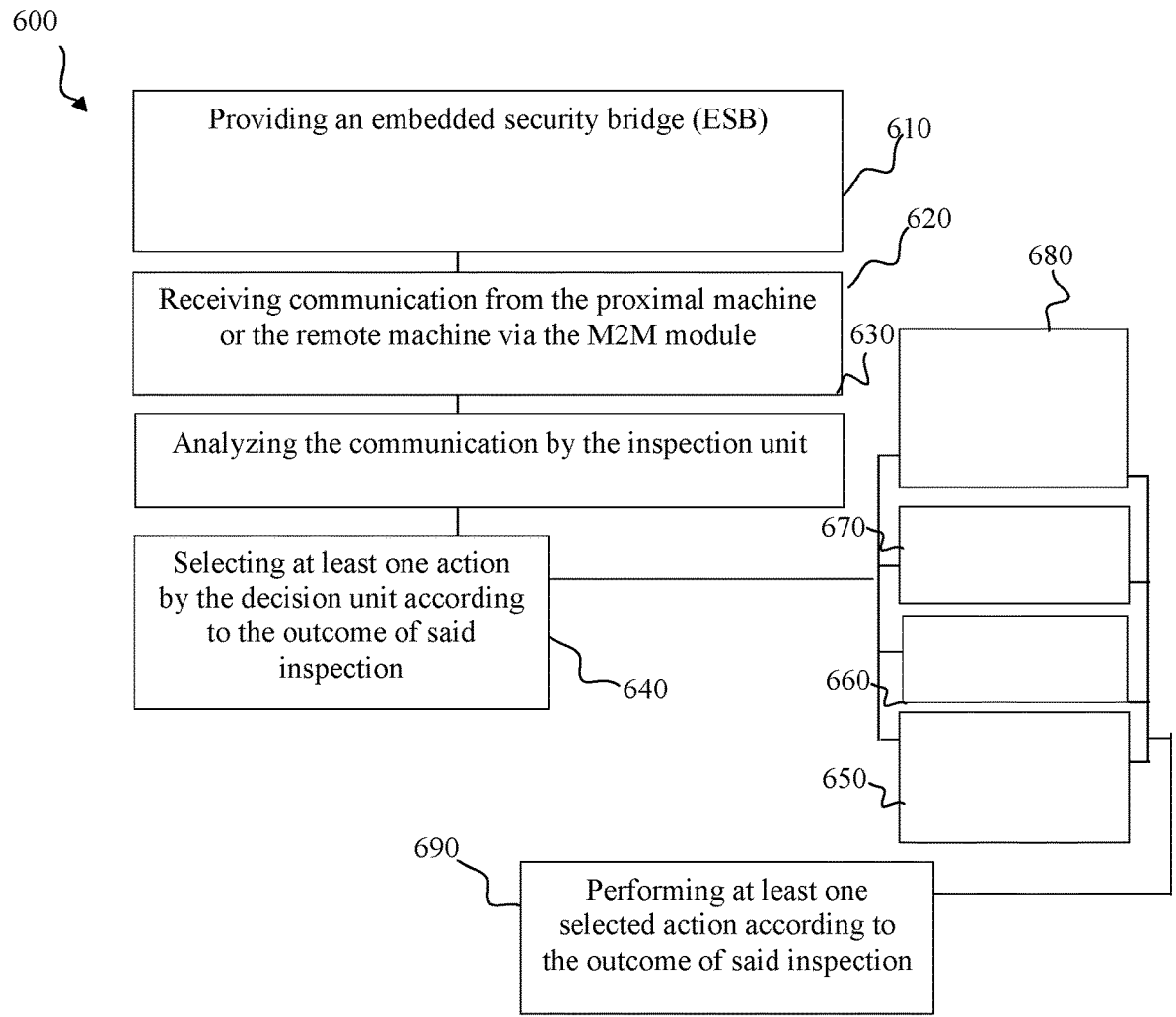

Reference is now made to FIG. 6 illustrating a schematic diagram of a method (600) for machine to machine (M2M) communication cyber-attack detection and prevention. The first step (610) includes providing at least one embedded security bridge (ESB), useful for machine to machine (M2M) communication cyber-attack detection and prevention, the ESB is operatively connected to: (i) at least one proximal machine; and, (ii) at least one M2M module, the M2M is further in communication with at least one remote machine, the M2M module is configured to enable communication between at least one remote machine and at least one proximal machine through the ESB. The ESB comprises: (i) one or more inspection units, configured for analysis of the communication for identifying communication and/or content suspicious as malicious; and, (ii) one or more decision units operatively connected to the inspection unit, the decision unit is configured to perform at least one action based on the analysis of at least one inspection unit. The second step (620) is receiving communication originating from the proximal machine or the remote machine through the M2M module. The following step is (630) inspecting and analyzing the communication by the inspection unit for identifying communication and/or content suspicious as malicious; and, then the step (640) of the decision unit selecting at least one action based on the inspection and analysis of the communication and/or content from a group consisting of forwarding (680) the communication to at least one recipient (remote machine), altering (670) the communication, generating an alert, trigger or both, blocking, deleting (650) or both the communication, and any combination thereof. The following step (690) is performing the selected step.

The ESB is configured to detect by means of the inspection unit and prevent by means of the decision unit cyber-attacks on the proximal machine, at least one remote machine, or both.

According to another embodiment of the invention, a method as defined above is disclosed, additionally comprising the step of the ESB detecting and preventing at least one of the following activities, by means of the inspection unit and the decision unit: (a) unauthorized use of at least one remote machine, proximal machine or both; (b) unauthorized access to the communication; (c) hijacking of at least a portion of the communication session; (d) communication timing attacks; (e) information attacks; (f) credentials attacking; (g) configuration attacks; (h) attacks against the proximal machine; (i) attack on the core network; and, (j) user data and identity attacks According to another embodiment of the invention, a method as defined above is disclosed, additionally comprising the step of the ESB detecting and preventing at least one of the following activities: (a) unauthorized use of at least one remote machine, the proximal machine, or both; (b) unauthorized access to at least a portion of at least one remote machine, the proximal machine, or both; (c) false representation of at least a portion of the communication; (d) false forwarding of at least a portion of at least one communication packet; (e) including malicious code in at least a portion of the communication; (f) cloning and multiplying at least a portion of the communication; (g) preventing at least one remote machine, proximal machine, or both, from operating normally; (h) hijacking of at least a portion of the communication; (i) information leakage from at least one remote machine, the proximal machine, or both; (j) configuration change of at least one remote machine, the proximal machine, or both; (k) changing at least a portion of the communication selected from a group consisting of: content, origin data, destination data, protocol format, and any combination thereof; (l) deleting at least a portion of the communication; (m) delaying at least one communication packet; and, (n) changing the order of at least one communication packet.

According to another embodiment of the invention, a method as defined above is disclosed, additionally comprising the step of providing the ESB at least partly implemented into the proximal machine.

According to another embodiment of the invention, a method as defined above is disclosed, additionally comprising the step of providing the M2M module at least partly implemented into the ESB, the proximal machine, or both.

According to another embodiment of the invention, a method as defined above is disclosed, additionally comprising the step of further providing one or more communication handler unit operatively connected for communication with both at least one proximal machine's main processing unit (MPU) and the ESB.

According to another embodiment of the invention, a method as defined above is disclosed, additionally comprising the step of communicating by means of one or more communication handler units with both at least one proximal machine's main processing unit (MPU) and the ESB.

According to another embodiment of the invention, a method as defined above is disclosed, additionally comprising the step of providing the ESB implemented in at least one of the following ways: (a) externally connected between the proximal machine's MPU and the M2M module; (b) embedded in the proximal machine; and, (c) embedded in the M2M module.

According to another embodiment of the invention, a method as defined above is disclosed, additionally comprising the step of configuring the inspection unit to analyzing the communication by at least one of the following: (a) inspecting of at least one communication packet content; (b) validating of the identity and authenticity of the communication originator; and, (c) verifying of at least one characteristic of the network environment serving the M2M module.

According to another embodiment of the invention, a method as defined above is disclosed, additionally comprising the step of analyzing by means of said inspection unit the communication by at least one of the following: (a) inspecting of at least one communication packet content; (b) validating of the identity and authenticity of the communication originator; and, (c) verifying of at least one characteristic of the network environment serving the M2M module.

According to another embodiment of the invention, a method as defined above is disclosed, additionally comprising the step of the inspection unit actively interrogating the M2M module for at least one characteristic of its serving network environment.

According to another embodiment of the invention, a method as defined above is disclosed, additionally comprising the step of the decision unit performing at least one of the following actions: (a) forwarding the communication on to at least one machine; (b) blocking the communication; (c) deleting the communication; (d) altering at least a portion of the content and/or at least a portion of at least one communication packet before relaying it to at least one remote machine or the proximal machine; (e) generating an alert; and, (f) sending a trigger to at least one of the following: at least one proximal machine, at least one remote machine, and, a third party.

According to another embodiment of the invention, a method as defined above is disclosed, additionally comprising the step of the decision unit configuring an event comprising at least one of the following: the analysis of the inspection unit, the communication details, and the action performed by the decision unit, further wherein the event is logged by the decision unit.

According to another embodiment of the invention, a method as defined above is disclosed, additionally comprising the step of the decision unit determining the action performed based on a security policy.

According to another embodiment of the invention, a method as defined above is disclosed, additionally comprising the step of applying the security policy according to at least one of the following: (a) current communication packet; (b) at least one previously received communication packet; and, (c) at least one combination of a series of communication packets received.

According to another embodiment of the invention, a method as defined above is disclosed, additionally comprising the step of selecting the security policy from a group consisting of: predefined, adjustable, self-learning, and any combination thereof.

According to another embodiment of the invention, a method as defined above is disclosed, additionally comprising the step of providing the M2M module comprising a connection interface to the network that is wireless, physical, or both.

According to another embodiment of the invention, a method as defined above is disclosed, additionally comprising the step of providing the wireless network comprising one or more, but not limited to, of the following: (a) cellular network; (b) Wi-Fi network; (c) satellite communication network; (d) ad-hoc point-to-point wireless communication; (e) acoustic transmissions; (f) near field communication (NFC); (g) RFID; (h) blue tooth network; (i) ZigBee; and, (j) WiMAX.

The present invention further discloses a method for machine to machine (M2M) communication cyber-attack detection and prevention, the method characterized by the following steps: (a) providing an embedded security bridge system (SBS) for machine to machine (M2M) communication cyber-attack detection and prevention, comprising: (a) one or more M2M module in communication with at least one remote machine, the M2M module configured for enabling communication between at least one remote machine and at least one first proximal machine; (b) at least one embedded security bridge (ESB) the ESB operatively connected to: (i) at least one proximal machine; and, (ii) at least one M2M module; the ESB comprises: (a) one or more inspection units, configured for analysis of the communication for identifying communication and/or content suspicious as malicious; and, (b) one or more decision units operatively connected to the inspection unit, the decision unit is configured to perform at least one action based on the analysis of at least one inspection unit; (b) receiving communication originating from the proximal machine or the remote machine through the ESB; (c) analyzing the communication by the inspection unit for identifying communication and/or content suspicious as malicious; and, (d) performing at least one action by decision unit based on the analysis of the communication and/or content by the inspection unit.

What is claimed is:

1. An embedded security bridge (ESB), useful for machine to machine (M2M) communication cyber-attack detection and prevention, the ESB operatively connected to:
    a. at least one proximal machine; and,
    b. at least one M2M module, the M2M module is further in communication with at least one remote machine, the M2M module is configured to enable communication between the at least one remote machine and the at least one proximal machine, wherein the communication between the at least one remote machine and the at least one proximal machine is conducted through the ESB communicatively positioned between the M2M module and the at least one proximal machine;
    said ESB comprises:
    a. one or more inspection units comprising at least one hardware processor executing code, the code comprising code instructions for:
        i. actively interrogating the at least one M2M module for at least one characteristic of a serving network environment used by said at least one M2M module, said at least one characteristic is a member of a group consisting of communication protocols used, frequencies used, type of data transferal over said frequencies and signal properties,
        ii. analyzing the communication between the at least one remote machine and the at least one proximal machine for at least verifying the at least one characteristic of said serving network environment, and
        iii. identifying communication and/or content suspicious as malicious; and,
    b. one or more decision units operatively connected to the inspection unit, the decision unit comprising at least one hardware processor executing code, the code comprising code instructions for performing at least one action based on the analysis of at least one the inspection unit;
    wherein the ESB is configured to detect by means of the inspection unit and prevent by means of the decision unit cyber-attacks on the proximal machine, and is further configured to detect, by means of the inspection unit, and prevent, by means of the decision unit, cyber-attacks on the remote machine; and
    wherein the at least one action comprising at least one of:
    a. blocking at least a portion of the communication; and
    b. altering at least a portion of the content and/or at least a portion of at least one communication packet before relaying it to the at least one remote machine or to the at least one proximal machine.

2. The ESB according to claim 1, wherein the ESB is configured to detect and prevent at least one of the following activities, by means of the inspection unit and the decision unit:
    a. unauthorized use of at least one the remote machine, the proximal machine or both;
    b. unauthorized access to the communication;
    c. hijacking of at least a portion of the communication session;
    d. communication timing attacks;
    e. information attacks;
    f. credentials attacking;
    g. configuration attacks;
    h. attacks against the proximal machine;
    i. attack on a core network; and,
    j. user data and/or identity attacks.

3. The ESB according to claim 1, wherein at least a portion of the ESB is implemented into the proximal machine.

4. The ESB according to claim 1, wherein the ESB further comprises one or more communication handler unit comprising at least one hardware processor executing code, the code comprising code instructions for communicating with both the proximal machine's main processing unit (MPU) and the ESB.

5. The ESB according to claim 1, wherein the ESB is implemented in at least one of the following ways:
   a. externally connected between the proximal machine's MPU and the M2M module;
   b. embedded in the proximal machine; and,
   c. embedded in the M2M module.

6. The ESB according to claim 1, wherein the at least one hardware processor of the inspection unit is executing code instructions for analyzing the communication by at least one of the following:
   a. inspection of at least one communication packet content; and
   b. validation of the identity and authenticity of a communication originator.

7. The ESB according to claim 1, wherein the at least one action, performed by the at least one decision unit, is selected from the following:
   a. forwarding the communication on to at least one the remote machine or the proximal machine;
   b. generating an alert; and,
   c. sending a trigger to at least one of the following: at least one the proximal machine, at least one the remote machine, and, a third party.

8. The ESB according to claim 1, wherein the at least one hardware processor of the decision unit is executing code instructions for generating at least one event, the event comprising at least one of the following: the analysis of the inspection unit, the communication details, and the action performed by the decision unit; further wherein the event is logged by the decision unit.

9. The ESB according to claim 1, wherein the at least one hardware processor of the decision unit is executing code instructions for selecting the action performed based on a security policy.

10. The ESB according to claim 9, wherein the security policy is applied according to the inspection unit analysis of at least one of the following:
    a. current communication packet;
    b. at least one previously received communication packet; and,
    c. at least one combination of a series of communication packets received.

11. The ESB according to claim 9, wherein the security policy is selected from a group consisting of: predefined, adjustable, self-learning, and any combination thereof.

12. The ESB according to claim 1, wherein the M2M module comprises one or more connection interface to the network that is wireless, physical, or both.

13. The ESB according to claim 12, wherein the M2M wireless network comprises one or more of the following:
    a. cellular network;
    b. Wi-Fi network;
    c. satellite communication network;
    d. ad-hoc point-to-point wireless communication;
    e. acoustic transmissions;
    f. near field communication (NFC);
    g. RFID;
    h. blue tooth network;
    i. ZigBee; and,
    j. WiMAX.

14. The ESB according to claim 1, wherein said at least one characteristic is a plurality of characteristics including at least one major network station used, origin of transmission and encryption types.

15. An embedded security bridge system (SBS) for machine to machine (M2M) communication cyber-attack detection and prevention, comprising:
    a. one or more M2M module in communication with at least one remote machine, the M2M module configured for enabling communication between at least one remote machine and at least one proximal machine;
    b. at least one embedded security bridge (ESB) the ESB operatively connected to:
       i. the at least one proximal machine; and,
       ii. at least one M2M module,
    wherein the communication between the at least one remote machine and the at least one proximal machine is conducted through the ESB communicatively positioned between the M2M module and the at least one proximal machine,
    the ESB comprises:
       i. one or more inspection units, comprising at least one hardware processor executing code, the code comprising code instructions for:
          a. actively interrogating the M2M module for at least one characteristic of a serving network environment used by said M2M module, said at least one characteristic is a member of a group consisting of communication protocols used, frequencies used, type of data transferal over said frequencies and signal properties,
          b. analyzing the communication for at least verifying the at least one characteristic of said serving network environment, and
          c. identifying communication and/or content suspicious as malicious; and,
       ii. one or more decision units operatively connected to the inspection unit, the decision unit comprising at least one hardware processor executing code, the code comprising code instructions for performing at least one action based on the analysis of at least one the inspection unit;
    wherein the M2M module is configured to enable communication between the at least one proximal machine and the at least one remote machine through the ESB;
    further wherein the ESB is configured to detect by means of the inspection unit and prevent by means of the decision unit cyber-attacks on said proximal machine, and wherein the ESB is further configured to detect, by means of the inspection unit, and prevent, by means of the decision unit, cyber-attacks on the remote machine; and
    wherein the at least one action comprising at least one of:
       a. blocking at least a portion of the communication; and
       b. altering at least a portion of the content and/or at least a portion of at least one communication packet before relaying it to the at least one remote machine or to the at least one proximal machine.

16. A method for machine to machine (M2M) communication cyber-attack detection and prevention, the method characterized by the following steps:
    a. providing at least one embedded security bridge (ESB), useful for machine to machine (M2M) communication cyber-attack detection and prevention, the ESB operatively connected to:
       i. at least one proximal machine; and,
       ii. at least one M2M module, the M2M is further in communication with at least one remote machine, the at least one M2M module is configured to enable communication between the at least one remote machine and the at least one proximal machine;

wherein the communication between the at least one remote machine and the at least one proximal machine is conducted through the ESB communicatively positioned between the M2M module and the at least one proximal machine, the ESB comprising:
- i. one or more inspection units comprising at least one hardware processor executing code, the code comprising code instructions for:
  - a. actively interrogating the one or more M2M module for at least one characteristic of a serving network environment used by said one or more M2M module, said at least one characteristic is a member of a group consisting of communication protocols used, frequencies used, type of data transferal over said frequencies and signal properties,
  - b. analyzing the communication between the at least one remote machine and the at least one proximal machine for at least verifying the at least one characteristic of said serving network environment, and
  - c. identifying communication and/or content suspicious as malicious and directed towards the at least one remote machine and for identifying communication and/or content suspicious as malicious and directed towards the at least one proximal machine; and,
- ii. one or more decision units operatively connected to the inspection unit, said decision unit comprising at least one hardware processor executing code, the code comprising code instructions for performing at least one action based on said analysis of at least one said inspection unit;
- b. receiving communication originating from the proximal machine or the remote machine through the ESB;
- c. analyzing the communication by the inspection unit for identifying communication and/or content suspicious as malicious; and,
- d. performing at least one action by the decision unit based on the analysis of the communication and/or content by the inspection unit;

wherein the at least one action comprising at least one of:
- a. blocking at least a portion of the communication; and
- b. altering at least a portion of the content and/or at least a portion of at least one communication packet before relaying it to the at least one remote machine or to the at least one proximal machine.

17. The method according to claim 16, additionally comprising the step of the ESB detecting and preventing at least one of the following activities, by means of the inspection unit and the decision unit:
- a. unauthorized use of the at least one remote machine, the at least one proximal machine or both;
- b. unauthorized access to the communication;
- c. hijacking of at least a portion of the communication session;
- d. communication timing attacks;
- e. information attacks;
- f. credentials attacking;
- g. configuration attacks;
- h. attacks against the at least one proximal machine;
- i. attack on core network; and,
- j. user data and/or identity attacks.

18. The method according to claim 16, additionally comprising the step of the at least one hardware processor of the inspection unit executing code instructions for analyzing the communication by at least one of the following:
- a. inspecting of at least one communication packet content; and
- b. validating of the identity and authenticity of the communication originator.

19. The method according to claim 16, additionally comprising the step of the at least one hardware processor of the decision unit executing code instructions for performing at least one of the following actions:
- a. forwarding the received communication to at least one the machine;
- b. deleting the received communication;
- c. generating an alert; and,
- d. sending a trigger to at least one of the following: the at least one proximal machine, the at least one remote machine, and, a third party.

* * * * *